(No Model.)  4 Sheets—Sheet 1.

J. RICHARDSON & B. R. ROWLAND.
VALVE GEAR.

No. 435,323.  Patented Aug. 26, 1890.

Witnesses:
J. A. Rutherford.
Percy B. Hill.

Inventors:
John Richardson
Bartholomew R. Rowland.
By James L. Norris.
Attorney

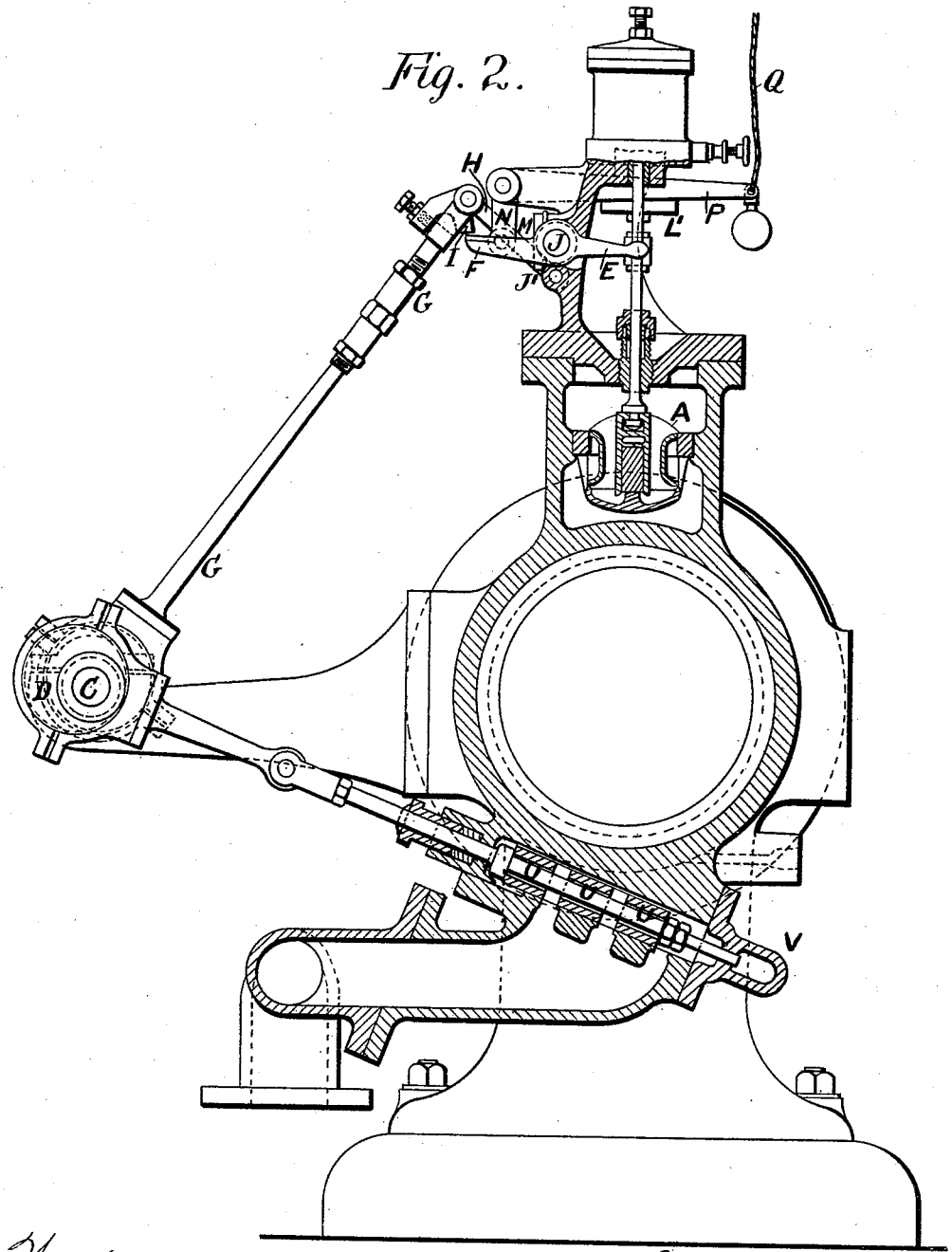

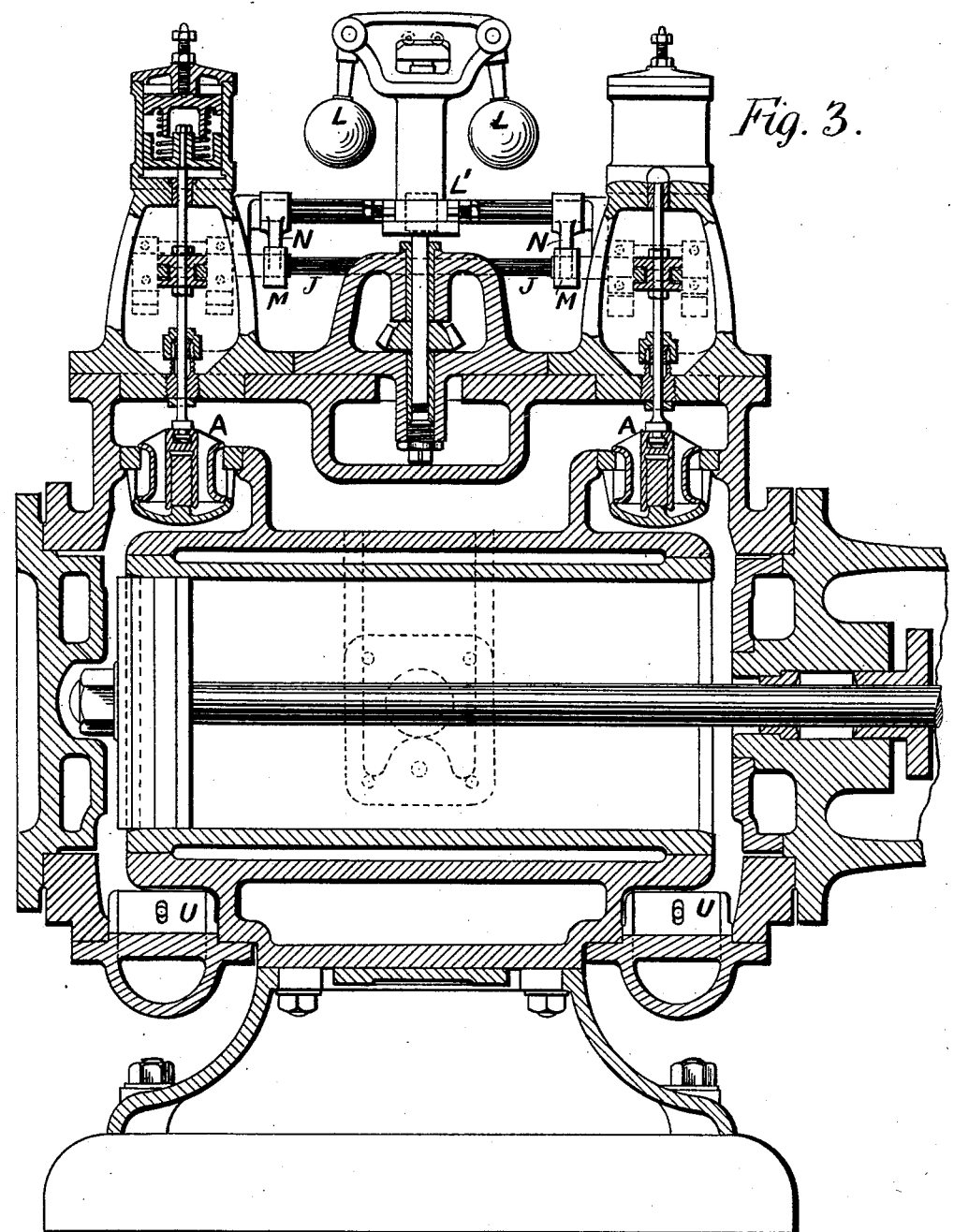

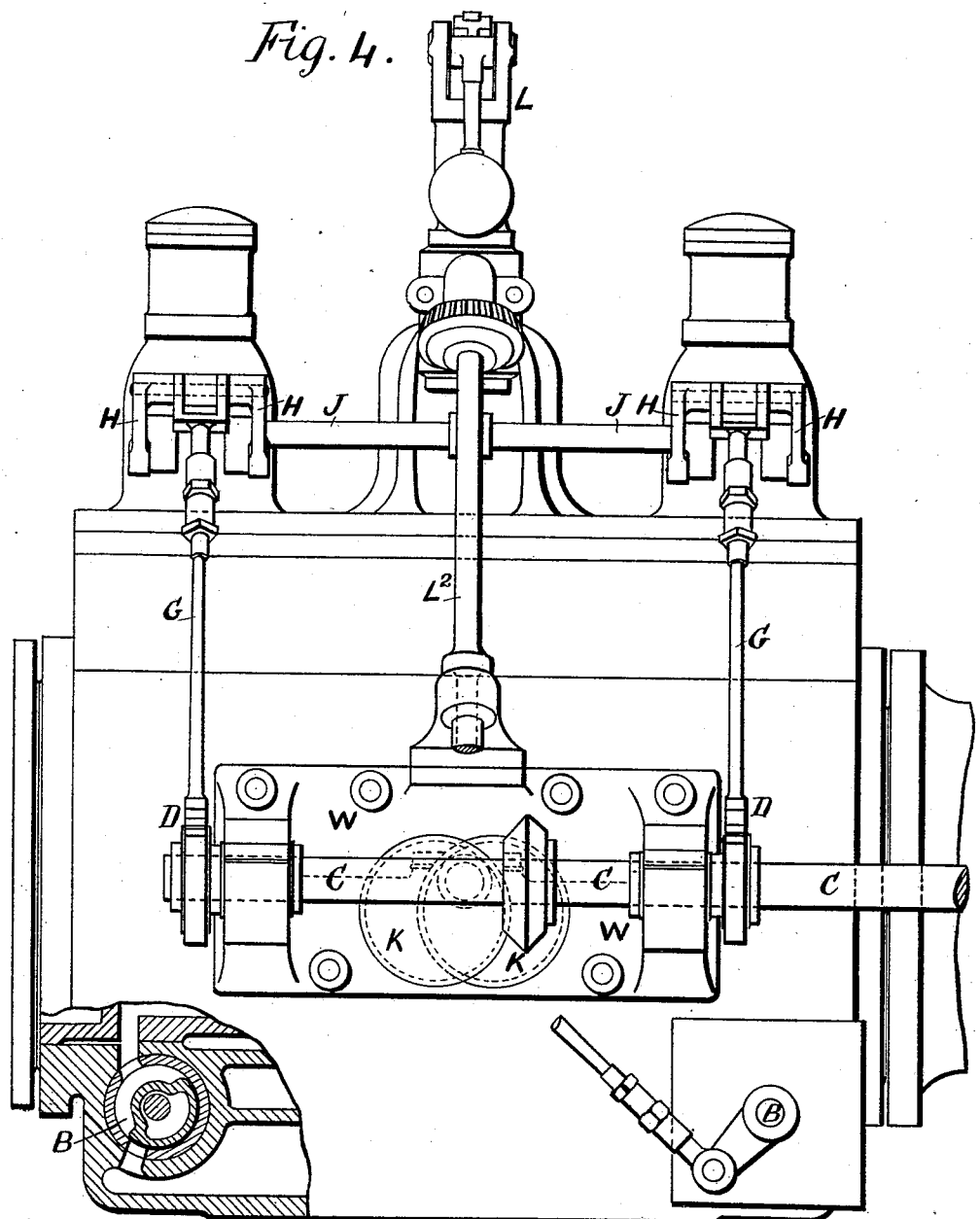

UNITED STATES PATENT OFFICE.

JOHN RICHARDSON AND BARTHOLOMEW RICHMOND ROWLAND, OF LINCOLN, ENGLAND.

VALVE-GEAR.

SPECIFICATION forming part of Letters Patent No. 435,323, dated August 26, 1890.

Application filed April 10, 1890. Serial No. 347,396. (No model.) Patented in England March 11, 1887, No. 3,744.

*To all whom it may concern:*

Be it known that we, JOHN RICHARDSON and BARTHOLOMEW RICHMOND ROWLAND, subjects of the Queen of Great Britain, both residing at Lincoln, in the county of Lincoln, England, have invented new and useful Improvements in Valve-Gear for Steam-Engines, (for which we have obtained a patent in Great Britain, No. 3,744, bearing date March 11, 1887,) of which the following is a specification.

This invention relates to improvements in valve-gear for steam-engines, whereby "Corliss" and trip-valve gear can be worked more effectively and economically than previously, and also provides for automatically varying the point of cut-off.

Figure 1:
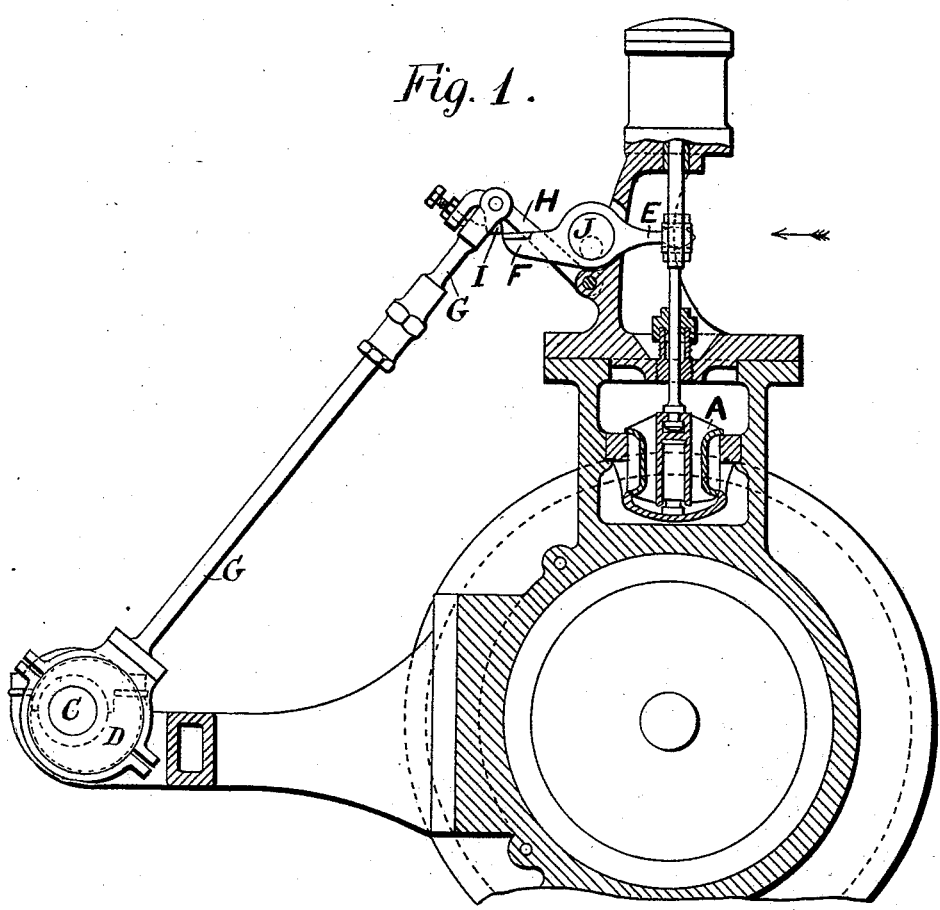
Figure 5:
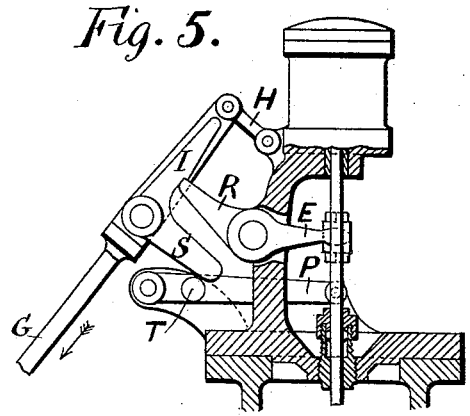

The invention will be understood by the annexed drawings, in which—
Figure 1 is a vertical section taken through an engine at the admission-valve. Fig. 2 is a similar view showing a slightly-different construction. Fig. 3 is a vertical longitudinal section through the cylinder. Fig. 4 is a side elevation of the cylinder and valves, partly in section, and Fig. 5 is a detail section of still another modification.

The engine to which it is applied is built with Cornish double-beat valves A A (see Figs. 1, 2, and 5) (for the admission) and with oscillating exhaust-valves B B, (see Fig. 4,) and instead of being worked by eccentrics, as is usual, they are all worked by a shaft C, rotating at the same speed as the crank-shaft and at right angles with the same parallel to the bed of the engine. The admission-valves A A are governed by eccentrics D D direct from this horizontal shaft C, and so far the invention is common with many others of the same kind.

One improvement relates to the admission-valves A A, and consists of a release arrangement, said valves being lifted by levers E E, the outer ends F F of which are depressed by an appliance I, connected to the eccentric-rods G. The upper ends of the connecting-rods G are carried by link-rods H as are also the trippers I I, which describe an arc, so that as the trippers I partake of a descending motion through the action of the eccentrics D they move farther from the center of the lever E until they release themselves from the end F of the lever E, which permits the valves A A to fall instantly onto their seats.

According to one arrangement, as at Fig. 1, we make the center pin J eccentric, upon which the trip-levers E E work, so that they— *i. e.*, the levers—can be moved to the right and to the left to determine the length of time that the valves A should be held open, and their position is controlled by the governor-spindle, to which the center pin is attached. From this arrangement the eccentric J of the trip-lever when moved in one direction causes the release to take place earlier, while if it is moved in the direction of the arrow it will be later.

Instead of the fulcrum J being an eccentric, as at Fig. 1, it may be a round rod, as at Figs. 2 and 3, and movable in the housings J' horizontally. The fulcrum J is coupled by small connecting-rods M M to lever N, by which a horizontal motion is given to the fulcrum in the housings by the varying positions of the governor L, which operates the lever P, the two being connected at L'. By this means the point F of the tripping-lever is caused to approach to and recede from the tripper I, and thus vary the point of cut-off. The lever P may have a cord or wire Q attached to it, which may be carried all round the mill or factory driven by the engine, and in case of any accident any person pulling the cord can at once stop the engine and thus prevent further damage.

Fig. 5 shows another modification of the trip-gear. In this case the valve-lever E is cranked, as shown at R, and is actuated by a tripper I, which is an arm at right angles to it. When working in the direction of the arrow, so as to open the valve, the arm S of the tripper I comes in contact with the rod T, the position of which is adjustable by the governor L. Immediately the arm S touches the rod T the tripper I is released and the valve A falls.

A further part of the invention (shown at Fig. 4) relates to means for working the oscillating exhaust-valves B B from a short shaft C', which is at right angles to the main valve-gear shaft C and is carried by the same bracket W. This shaft C' has two cranks forged within it, or two eccentrics K K fitted upon it at suitable angles for working the exhaust-valves B B. The shaft C also serves as a convenient means for driving the governors L L through the rod L².

Instead of fitting oscillating valves, as at Fig. 4, we may fit triple-ported slide-valves U U, (see Figs. 2 and 3,) worked at angles to the center line of cylinder and close underneath the same. The working-faces of the valves U U are those farthest removed from the cylinder. Thus they are always pressed toward the face by the pressure of steam within the cylinder and are never exposed to a greater pressure than this. Owing to their relation with the valve-driving shaft C they are easily and simply worked. The exhaust-valves U U are so made that they can be easily examined or removed for repairs by unfastening the covers V V without disturbing any other joints.

What we claim, and desire to secure by Letters Patent, is—

1. In a steam-engine, the combination, with the valve A, shaft C, connecting-rod G, eccentrically mounted thereon, and lever E, of the tripper I, carried by said connecting-rod and acting on the lever with the movements of the connecting-rod, substantially as described.

2. In a steam-engine, the combination, with the valve A, shaft C, connecting-rod G, eccentrically-pivoted lever E, and tripper I, of the connecting-rods M, lever N, and governor L, all operating so that the action of the governor controls the point of cut-off between the tripper and the lever, substantially as described.

3. In a steam-engine, the combination, with the valve A, shaft C, connecting-rod G, eccentrically-pivoted lever E, tripper I, connecting-rods M, and lever N, of the lever P, connected to the lever N, and the cord Q for acting on the operating-lever E to throw it out of action with the tripper, substantially as described.

In witness whereof we have hereunto signed our names, in the presence of two subscribing witnesses, this 21st day of March, 1890.

JOHN RICHARDSON.
BARTHOLOMEW RICHMOND ROWLAND.

Witnesses:
 JOHN WILLIAMSON,
 ERNEST WILLIAM WHATTAM,
*Both of Globe Works, Lincoln, England.*